No. 630,608. Patented Aug. 8, 1899.
C. W. HILLS.
AUTOMATIC CATTLE GUARD GATE.
(Application filed May 25, 1899.)
(No Model.) 2 Sheets—Sheet 1.
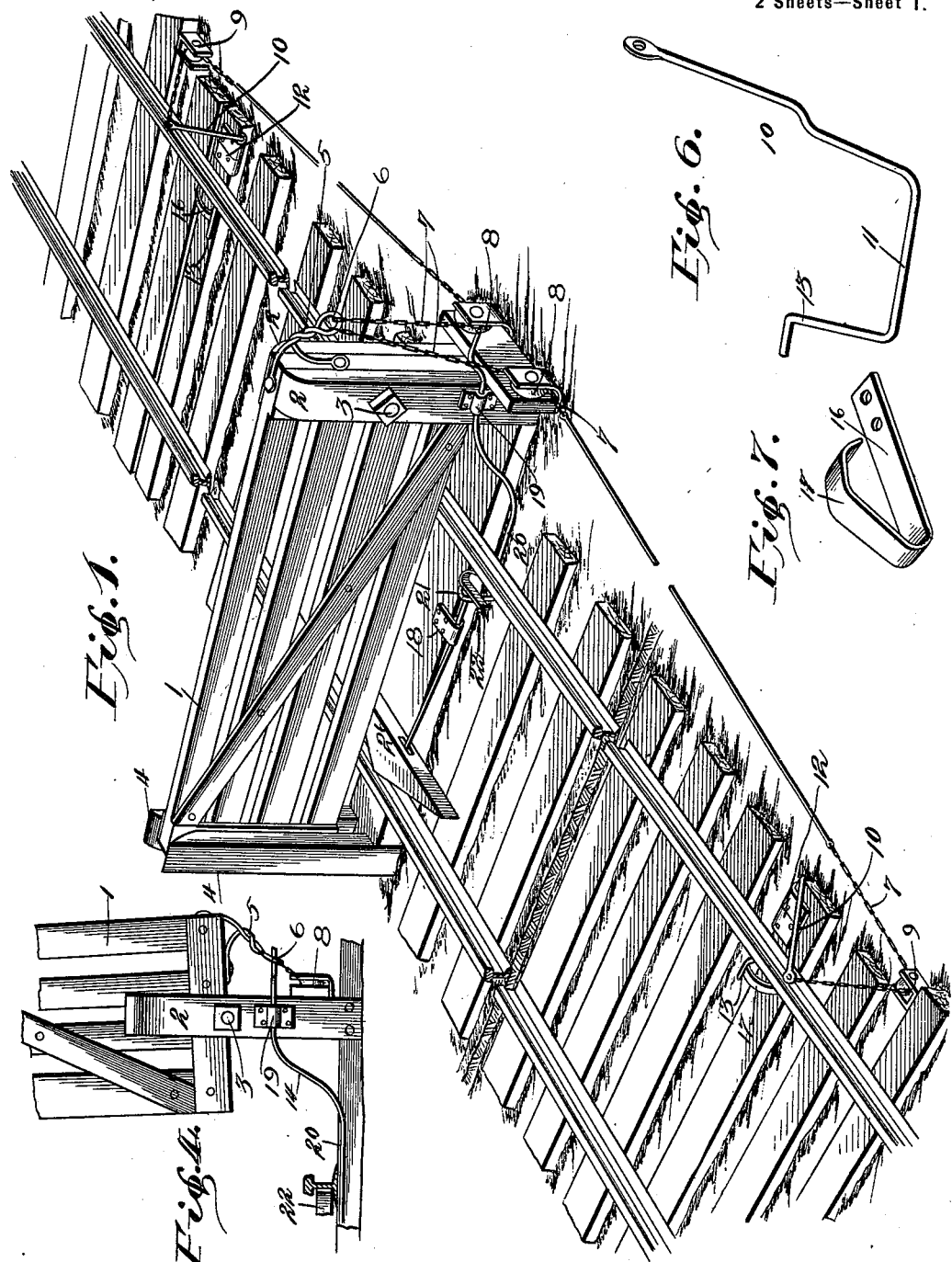
Witnesses
Charles W. Hills Inventor
By his Attorneys.

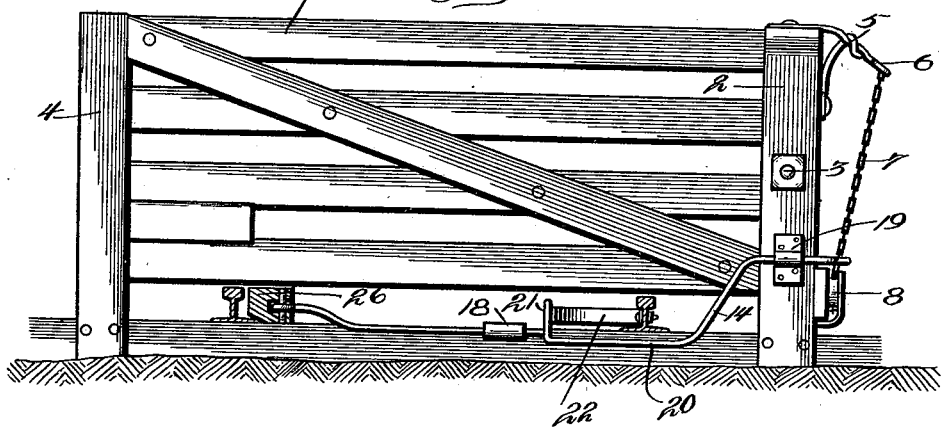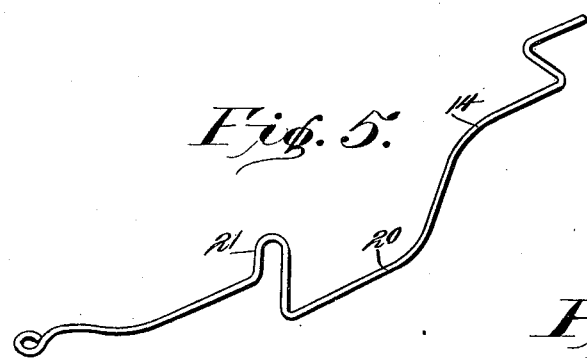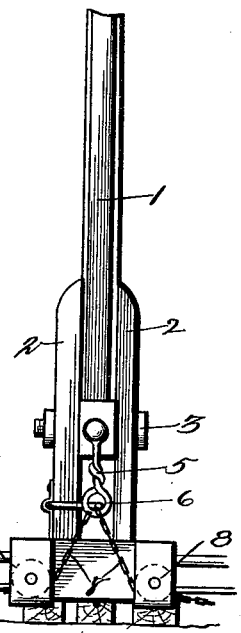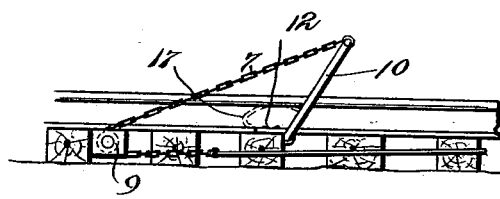

United States Patent Office.

CHARLES W. HILLS, OF JACKSON, MISSOURI.

AUTOMATIC CATTLE-GUARD GATE.

SPECIFICATION forming part of Letters Patent No. 630,608, dated August 8, 1899.

Application filed May 25, 1899. Serial No. 718,179. (No model.)

*To all whom it may concern:*

Be it known that I, CHARLES W. HILLS, a citizen of the United States, residing at Jackson, in the county of Cape Girardeau and State of Missouri, have invented a new and useful Automatic Cattle-Guard Gate, of which the following is a specification.

The invention relates to improvements in automatic cattle-guard gates.

The object of the present invention is to improve the construction of cattle-guard gates and to provide a simple, inexpensive, and efficient one capable of being automatically operated by the wheels of a passing train to open and close it and adapted to prevent stock from passing from one field or inclosure into another by way of a railroad-track.

The invention consists in the construction and novel combination and arrangement of parts hereinafter fully described, illustrated in the accompanying drawings, and pointed out in the claims hereto appended.

In the drawings, Figure 1 is a perspective view of an automatic cattle-guard gate constructed in accordance with this invention. Fig. 2 is a transverse sectional view, the gate being shown in elevation. Fig. 3 is a rear elevation. Fig. 4 is a detail view illustrating the manner of locking the gate in its open position. Fig. 5 is a detail view of the reciprocating locking-bar. Fig. 6 is a detail view of one of the rock-shafts. Fig. 7 is a similar view of one of the springs which support the rock-shafts and which cushion the fall of the gate.

Like numerals of reference designate corresponding parts in all the figures of the drawings.

1 designates a tilting gate designed to form a continuation of a fence and mounted between a pair of posts 2 on a horizontal pivot 3 and adapted to close between a pair of latch-posts 4. The gate is provided at its top, above the pivot 3, with a rearwardly-extending arm 5, having a loop 6, with which are connected operating-chains 7 or other suitable flexible devices, which extend from the gate in opposite directions. The flexible connections 7 extend downward from the loop 6 of the arm 5 and pass under pulleys 8 and extend therefrom to guide-pulleys 9, located beyond the gate, as clearly shown in Fig. 1 of the accompanying drawings. The outer portions of the cables or chains pass around the guide-pulleys 9 and extend over the top of the same toward the gate and are connected with outer arms 10 of rock-shafts 11. The rock-shafts 11, which are journaled in suitable bearings 12, extend beneath the rails and are provided at the inner faces of the adjacent rails with substantially L-shaped arms 13, adapted to be engaged by the wheels of a passing train and moved toward the gate, whereby the latter will be tilted and swung rearward on its pivot to open it. When the gate is open, it is retained in such position by a reciprocating locking-bar 14, which engages the loop 6.

The L-shaped arms at the inner ends of the rock-shafts normally rest against springs 16, consisting of shanks secured to the cross-ties or other suitable supports, and arms 17, which receive the said L-shaped arms of the rock-shaft and which are adapted to cushion the closing of the gate to prevent the same from being injured when it tilts or swings downward.

The reciprocating locking-bar 14, which is mounted in suitable guides 18 and 19, is provided between its ends with an offset portion 20, extending beneath the adjacent rail and forming a shoulder 21, which is engaged by a spring 22. The spring 22 is adapted to retract the locking rod or bar and disengage the same from the loop of the gate after a train has passed the same, whereby the said gate will be permitted to close. The inner or front end of the reciprocating locking bar or rod is secured to an oppositely-beveled block 23, located adjacent to one of the rails and adapted to be engaged by the wheels of a train, whereby the locking rod or bar is reciprocated and moved rearward to engage the arm of the gate. A train approaching the gate first engages the adjacent rock-shaft and rotates the same sufficiently to open the gate. The wheels of the train maintain the rock-shaft in such position, and thereby prevent the gate from closing until the wheels engage the block 23 and carry the locking bar or rod into the loop of the arm, whereby the gate will be locked in its open position until the train has passed beyond it. As soon as the train leaves the gate the spring 22 disengages the locking bar or rod from the opening of the loop of the arm of the gate, and the latter is permitted to close by gravity.

It will be seen that the gate is simple and comparatively inexpensive in construction, that it is positive, reliable, and automatic in its operation, and that it is adapted to prevent effectually stock from escaping from one field or inclosure and entering another by way of a railroad-track. The springs which support the inner arms of the rock-shafts in position to be engaged by the wheels of the train also limit the outward movement of the said arms, and thereby cushion the closing movement of the gate. The gate is locked in its open position, and the locking mechanism is retained in engagement with the gate until a train entirely leaves the latter.

Changes in the form, proportion, size, and the minor details of construction within the scope of the appended claims may be resorted to without departing from the spirit or sacrificing any of the advantages of this invention.

What is claimed is—

1. A device of the class described comprising the tilting gate designed to extend across a railway-track, operating mechanism connected with the gate, adapted to be actuated by the wheels of the train and arranged to open the gate, and a reciprocating locking device arranged to be operated by the wheels of the train and adapted to hold the gate in its open position while the train is passing, substantially as described.

2. A device of the class described comprising a tilting gate designed to extend across a railway-track, rock-shafts located at opposite sides of the gate and having arms arranged to be engaged by the wheels of a train, connections between the rock-shafts and the gate, and springs arranged to support the arms of the rock-shafts and adapted to cushion the gate in closing, substantially as described.

3. A device of the class described comprising a tilting gate designed to extend across a railway-track, rock-shafts provided with inner and outer arms, the inner arm being arranged to be engaged by the wheels of a train, flexible connections extending from the outer arms of the rock-shafts to the gate, pulleys receiving the flexible connections, and springs supporting the inner arms of the rock-shafts and adapted to cushion the gate in closing, substantially as described.

4. A device of the class described comprising a tilting gate, operating mechanism for opening the gate, a reciprocating locking-bar adapted to hold the gate open and provided with a block or head arranged to be engaged by the wheels of a train, and means for actuating the locking-bar to disengage the same from the gate, substantially as described.

5. A device of the class described comprising a tilting gate provided with an arm having an opening, a reciprocating locking-bar arranged to engage the opening of the arm when the gate is open and provided with an oppositely-beveled block or head arranged to be engaged by the wheels of a train, and a spring connected with the locking-bar and adapted to disengage the same from the arm of the gate, substantially as described.

In testimony that I claim the foregoing as my own I have hereto affixed my signature in the presence of two witnesses.

CHARLES W. HILLS.

Witnesses:
 EDGAR L. HOPE,
 FRED. GOYERT.